Patented Sept. 17, 1974

3,836,455
SEPARATION OF CLOSELY RELATED ALIPHATIC HYDROCARBONS WITH CATION-EXCHANGED OFFRETITE ZEOLITE
George C. Blytas, Houston, Tex., assignor to Shell Oil Company
No Drawing. Filed Feb. 9, 1973, Ser. No. 330,940
Int. Cl. C07c 7/12
U.S. Cl. 208—310                                    12 Claims

ABSTRACT OF THE DISCLOSURE

Aliphatic hydrocarbons of from 5 to 8 carbon atoms having two methyl substituents on the same carbon atom or more highly branched $C_5$ to $C_8$ aliphatic hydrocarbons are separated from aliphatic hydrocarbons of from 5 to 8 carbon atoms having two methyl groups on different carbon atoms or less-branched $C_5$ to $C_8$ aliphatic hydrocarbons by selective adsorption employing a specially-treated offretite zeolite which has been ion-exchanged with a Group IIA or rare earth metal. Use of this separation to increase the octane rating of gasoline is also disclosed.

BACKGROUND OF THE INVENTION

The invention relates to a process for separating a mixture of structurally related aliphatic hydrocarbons. More particularly, it relates to an improved selective adsorption process in which certain highly-branched aliphatic hydrocarbons are separated from less-branched aliphatic hydrocarbons by the use of a specially-treated, cation-exchanged offretite zeolite.

DESCRIPTION OF THE PRIOR ART

It is well known in the art that porous substances such as crystalline zeolites, silica gel, activated charcoal and "char" formed by pyrolyzing certain polymeric materials possess selective adsorption characteristics which make them generally useful in the separation of hydrocarbons. Such materials are commonly employed for the separation of aromatic hydrocarbons from non-aromatic hydrocarbons or for the separation of normal paraffins from branched chain paraffins. Since aromatic and branched chain paraffins generally have higher octane ratings than normal paraffins, a potentially useful application of molecular sieve separations is in the upgrading of gasoline by removing normal paraffins through selective adsorption.

While normal paraffins as a class have amongst the lowest octane ratings, there are certain types of branched chain paraffins, e.g., singly branched paraffins, and certain doubly branched paraffins which also have relatively low octane numbers and thus would be desirably separated from their more highly branched, higher octane isomers.

An example of a stream containing a mixture of high and low octane branched chain aliphatic hydrocarbons is isomerizate obtained by the catalytic isomerization of normal hexane. The product stream from such a process typically contains a mixture of relatively low octane methyl pentanes and higher octane dimethyl butanes which are extremely difficult to separate by conventional fractionation techniques. Another example of a stream which contains a mixture of difficult to separate isomers is the product stream from an alkylation unit, e.g., isobutane alkylate which typically contains relatively low octane components such as 2,4- and 2,5-dimethyl hexanes mixed with high octane components such as trimethyl pentanes. While a number of alternative schemes for effecting such separations have been proposed, including the use of crystalline aluminosilicate molecular sieves, most of these processes have proved to be less than satisfactory either because of poor selectivity or inadequate rates of adsorption or desorption of the sorbed components. The present invention provides a highly attractive means of effecting the separation of very closely related branched chain hydrocarbons which affords both a high degree of selectively and suitably fast adsorption and desorption rates.

SUMMARY OF THE INVENTION

It has now been found that aliphatic hydrocarbons of from 5 to 8 carbon atoms having two methyl substituents on the same carbon atom or more highly branched $C_5$ to $C_8$ aliphatic hydrocarbons can be separated from aliphatic hydrocarbons of from 5 to 8 carbon atoms having two methyl substituents on different carbon atoms or less branched $C_5$ to $C_8$ aliphatic hydrocarbons in a highly efficacious manner by contacting a feed stream containing a mixture of said aliphatic hydrocarbons with a bed of cation-exchanged offretite zeolite prepared by (1) calcining an offretite zeolite containing tetraalkylammonium ion at a temperature below 700° C. for a sufficient time that substantially all of the tetraalkylammonium ion is decomposed leaving hydrogen ion ($H^+$) sites on the zeolite, (2) treating said calcined offretite zeolite with an aqueous solution of a Group IIA or rare earth metal under conditions that essentially all of the $H^+$ ions and from 5 to 70% of the other exchangeable ions of said calcined offretite zeolite are exchanged with said metals and (3) heat treating said exchanged offretite zeolite at a temperature of from 200 to 600° C. for at least one-half hour.

Cation-exchanged offretite zeolites prepared in accordance with the invention have been found to be highly selective for the separation of more highly branched from less branched aliphatic hydrocarbons and to have fast rates of sorption and elution. This is particularly noteworthy since acidic offretite and offretite exchanged with certain cations not in accordance with the invention do not possess the capacities or selectivities requisite for effecting the desired separation.

Because of the excellent selectivity of the present absorbents for relatively low octane components such as methylpentanes and 2,4- and 2,5-dimethyl hexanes, the present process is eminently suited for the upgrading of the octane rating of $C_6$ isomerizate streams, alkylate streams, and other gasoline streams containing such lower octane components.

DESCRIPTION OF SPECIFIC EMBODIMENTS

The selective adsorbent employed in the present separation process is offretite zeolite which has been subjected to three critical steps, e.g., calcining cation-exchange with a Group IIA or rare earth metal and a post-exchange heat treatment. The term "offretite zeolite" as herein employed refers to a synthetic crystalline aluminosilicate having a crystal structure similar to that of naturally occurring offretite which is an hexagonal zeolite of the chabazite group. Preferred offretite zeolite starting materials are those which have been prepared with the aid of a tetraalkylammonium compound such as the offretite zeolites described in U.S. 3,578,398 to Jenkins. The as-synthesized form of the zeolite can be expressed in terms of mole ratios of oxides as follows:

$$(1.1 \pm .4)[xR_2O:(1-x)M_{2/n}O]:Al_2O_3:5-8SiO_2:zH_2O,$$

wherein $n$ is the valence of cation M, $z$ is between 0 and 8, R is tetraalkyl ammonium, $x$ is between 0.001 and 0.5 and M is a mixture of sodium and potassium. The mixture M can also include small amounts of lithium. Tetraalkylammonium compounds which are preferred for use in preparing said offretite zeolites are those having four of the same alkyl groups, especially tetramethylammonium compounds.

Suitable zeolites of this type can be prepared by heating an aqueous alkaline mixture containing sodium, potassium, tetraalkylammonium, aluminum and silicon in proportions hereinafter described to a reaction temperature of 70 to 210° C. until crystalline zeolites are formed and then separating the formed zeolites from the mother liquor, e.g., by filtration, decanting, or centrifuging. A typical starting mixture for use in preparing suitable offretite zeolites will have the following general composition expressed in equation form in terms of moles of the oxides: $aNa_2O$, $bK_2O$, $cR_2O$, $Al_2O_3$, $dSiO_2$, $eH_2O$, where R=tetra-alkylammonium. For a preparation in which $b=4.85$, $d=28$ and $e=452$, typical values for $a$ and $c$ are:

$$a=4.4 \text{ to } 5.2$$
$$c=1.0 \text{ to } 0.2$$
$$a+c=5.4$$

Preferably the ratio of silicon to aluminum in the starting mixture expressed in moles of the oxides is 8 to 16.

Suitable sources for sodium, potassium and tetraalkylammonium ions are the corresponding hydroxides. Suitable aluminum sources include aluminum hydroxides, sodium aluminate and activated aluminas such as gamma-alumina. Suitable sources of silicon include sodium silicate, silica gels, silicic acid, aqueous colloidal silica sols and amorphous solid silicas, such as fume silicas, chemically precipitated silicas and precipitated silica sols. Cogels of aluminum hydroxide on silica hydrogel may also be used as a source of aluminum and silicon. The term "cogel" as used here refers to a silica-alumina mixture obtained by precipitating on silica hydrogel and aluminum hydroxide gel. A cogel thus defined is therefore not a co-precipitate, since in the preparation of a coprecipitate silica hydrogel and aluminum hydroxide gel are simultaneously or nearly simultaneously precipitated from the solution Suitable cogels and their methods of preparation are known in the art and need not be described in detail herein.

To obtain the adsorbents employed in accordance with the invention, the above-described offretite zeolites are calcined at a temperature of from about 450° C. to 700° C. for a sufficient length of time to substantially decompose the tetraalkylammonium ions contained therein, thereby freeing the main channels of the crystalline structure. It is important that the calcining temperature not exceed 700° C. for any length of time since this will cause the absorption capacity of the resulting offretites for less branched aliphatic hydrocarbons to be substantially reduced.

After calcining, the offretite zeolite is treated with an aqueous solution of a Group IIA or rare earth metal under conditions that essentially all of the $H^+$ ions (resulting from the decomposition of the tetraalkylammonium ion) along with from 5 to 70% and preferably from 10 to 40%, of the other exchangeable ions (primarily sodium and potassium ions) present within the zeolite structure are replaced. A minor amount of sodium or potassium ions may be trapped in relatively inaccessible portions of the crystalline structure and thus are not exchangeable within the meaning intended above. Preferred Group IIA metals include magnesium and barium. Preferred rare earth metals include mixtures of cerium and lanthanum. The term rare earth metals as employed in this specification includes elements of atomic numbers 55 to 71, and also yttrium and scandium.

Ion exchange with the Group IIA and/or rare earth metals can be accomplished in a single step by treating the calcined offretite directly with an aqueous solution containing the metals, or in two steps, i.e., by first treating the calcined offretite with an aqueous solution containing ammonium ions followed by treatment with a solution containing the di- or trivalent metal ions. In the two step process a significant portion of the exchangeable cations are first replaced by ammonium ions which are then replaced by the di- or trivalent cation. Alternately, it is possible to apply the metals by heating the zeolite with a solution containing the metal ions along with $NH_4^+$ ions. Still another method which was found effective involves the use of solutions containing the metal ions and hydroxide ions.

Optimal conditions for effecting ion exchange will vary somewhat depending on the particular Group II metal or rare earth metal (or combination thereof) utilized. In general, the rate of cation exchange increases with increasing polarizing power (charge/size ratio). Barium for example has a lower rate of exchange than magnesium which in turn has a lower rate of exchange than the rare earth metals. For this reason the preparation of barium exchanged offretite requires longer periods of exchange (e.g., 24–72 hrs. with 2.5N $BaCl_2$ solution) than magnesium which if preceded by ammonium exchange, normally can be accomplished in 3 hours or less. On the other hand, one hour exchange with a mixture or rare earth metals, e.g., lanthanum and cerium, is generally sufficient to provide a selective offretite. The effect of exchange conditions on the conditions on the capacities and selectivities is further illustrated by the data in Table A.

After ion exchange has been effected, the resulting offretite zeolite is subjected to a post-exchange heating step at a temperature of from about 200 to 600° C. for a period of at least one-half hour. While offretite zeolites having suitable capacities and selectivities can be prepared employing low post-exchange heating temperatures, e.g., 200–300° C., it has been found that by using carefully controlled higher post-exchange heating temperatures, e.g., from 400 to 500° C., it is possible to markedly increase the selectivity of the offretite adsorbents as shown by the data in Table C. The term "selectivity" as herein employed refers to the ratio of the capacity of the adsorbent for 2-methyl pentane as compared to its capacity for 2,2-dimethylbutane, said capacities being expressed in terms of grams of the sorbed component per 100 grams of adsorbent.

In a preferred method of practicing the present invention, adsorption of the less branched hydrocarbons and their subsequent desorption is accomplished in a cyclical manner employing a pressure cycle (including stripping with an inert gas), a temperature cycle, or by the use of an eluent.

Adsorption-desorption via the use of a pressure cycle is known in the art and essentially involves passing a feed stream into an adsorption zone at a selected high initial pressure. At the end of the adsorption stage the adsorbed hydrocarbons are desorbed by reducing the pressure at the feed-end of the adsorption zone, thereby causing the adsorbed materials to progressively desorb and countercurrently flow from the adsorption zone. Desorption can also be accomplished at a constant pressure if desired by using an inert gas such as nitrogen, carbon dioxide or hydrogen, etc. as a stripping agent. The partial pressure of the adsorbed components in effect is reduced while the overall pressure in the system remains substantially constant.

In a cyclical adsorption-desorption process based on temperature adsorption of the hydrocarbon fraction is affected at a relatively low temperature. Desorption is then accomplished by increasing the temperature in the adsorption zone to a point at which a portion of the sorbed material is released from the molecular sieves. Details of this procedure, likewise, are known in the art.

In a preferred embodiment of the invention which is specially suitable for upgroding the octane rating of isomerizate streams, adsorption and desorption of the less-branched hydrocarbons is effected in the presence of an eluent. This procedure essentially comprises contacting the isomerizate stream with a bed of the previously described cation-exchanged offretite molecular sieves which bed is loaded with an eluent. During start-up of the process, the bed is preferably preloaded with eluent. Thereafter, the bed during the adsorption step will contain eluent from the previous desorption step. When the hydrocarbon feed is contacted with the eluent-loaded molecular sieve bed, the less-branched hydrocarbons are preferentially adsorbed on the offretite molecular sieves displacing a portion of the eluent which passes through the adsorption zone together with the non-adsorbed more highly-branched hydrocarbons. The non-adsorbed hydrocarbons can be separated and recovered from the eluent by distillation or a comparable fractionation means. If the eluent employed has a relatively high-octane rating, the non-adsorbed high-octane components need not be separated from the eluent at all.

The recovery of hydrocarbons adsorbed on the sieves is effected by elution generally using the same eluent as employed in adsorption step, although a different eluent may be employed. The desorbate can be recovered from the eluent, if desired, by distillation or other comparable means. Alternatively, the desorbate can be recycled to the isomerization process as hereinafter described.

Materials which can be suitably employed as eluents must be able to displace the sorbed portion of the feed under the conditions of elution and must be displaced by the sorbable portion of the feed under the conditions of sorption. When use is made of the invention to upgrade the octane rating of gasoline, it is desirable that the eluent have a relatively high octane number so that separation of the non-adsorbed high-octane components from the eluent can be avoided. Thus, the selection of an eluent for any particular application will vary depending on the composition of the feed and whether it is planned to separate the non-adsorbed hydrocarbons from the eluent. In application such as upgrading the octane number of isomerizate or similar streams, isobutane has been found to be a very suitable eluent. Other $C_4$ to $C_6$ aliphatic hydrocarbons having the above-mentioned characteristics can also be suitably employed.

The present separation process can be advantageously employed in conjunction with most any isomerization process wherein a mixture of more highly branched and less-branched aliphatic hydrocarbons of from five to eight carbon atoms are produced, which combination process forms a further embodiment of the invention. Typical of such isomerization processes is the conversion of normal pentane and/or hexane to their corresponding isoparaffins at relatively low temperatures, e.g., below 150° C., with supported Friedel-Crafts type catalysts, e.g., the halides, particularly chlorides, of aluminum, zinc, iron, cadmium, tin or the like, either alone or in admixture, supported on alumina or silica. An example of such a process is that described in U.S. 2,250,410 to Van Peski.

The present separation process employing isobutane as diluent has been found particularly suitable for use in conjunction with such low temperature isomerization processes. In this embodiment, the product stream from the isomerization process is contacted with the heretofore described cation-exchanged offretite zeolite whereby the more highly branched, higher octane components are separated from the less branched, lower octane components, which are sorbed on the offretite zeolite. The less-branched aliphatic hydrocarbons are subsequently desorbed from the offretite employing isobutane as eluent, and the resulting desorbate stream is recycled to the isomerization process.

The recycle of the desorbate containing isobutane to the isomerization process is particularly advantageous in that isobutane functions to suppress unwanted said reactions and prolong the life of the isomerization catalyst as disclosed in U.S. 2,393,051 to McMillan et al. Thus, in this embodiment of the invention, the isobutane required to favorably effect isomerization, is at least in part supplied from the desorption step of the separation process.

The invention and the advantages thereof will be further evident from the following examples which are given for illustrative purposes only and hence should not be construed as limiting.

EXAMPLE I

This example describes the preparation of a cation-exchanged offretite zeolite suitable for use in the inventive process.

197 g. of sodium hydroxide pellets were dissolved in 400 mls. of water. The solution was cooled by addition of a further 600 mls. of water. 29 g. of pure aluminum foil was slowly dissolved in this solution. During this step the reaction was controlled by simultaneously adding 800 mls. of water. If this aluminate solution appeared cloudy, it was filtered rapidly through a coarse glass frit.

The solution was transferred to a 12 liter 4-necked Pyrex glass kettle, equipped with condensers, a variable speed electric stirrer, a thermometer and a heating mantle. Stirring was commenced and the following components added: 342 g. of potassium hydroxide pellets, 139 g. of a 25% wt. aqueous solution of tetramethylammonium hydroxide, and 1800 g. of water. After stirring for 5 minutes a further 3500 g. of water was added in 500 ml. portions along with 917 g. of 3–8 mesh, dried, silica gel.

Heating was commenced and the mixture was stirred vigorously until it began to reflux. After 4 hours of vigorous stirring, the stirring was reduced. Refluxing was continued for 5–7 days. The contents were then cooled, filtered, washed several times by batchwise slurrying with hot water and dried at 120° C. The resultant product was established by X-ray powder diffraction to be offretite.

The as-synthesized offretite was subsequently calcined in a vented furnace for 16 hours at 550° C. to substantially decompose the tetramethylammonium ions contained therein. The decomposition of tetramethylammonium ions results in $H^+$ ions which make the calcined offretite acidic. The calcined offretite was then ion exchanged by first treating it with 2N $NH_4Cl$ for 24 hours at 90° C., and then heating it with a 2N $MgCl_2$ solution for 24 hours at 90° C. The ion-exchanged offretite was then heated to 300° C. for 1 hour. The sorptive capacity of this zeolite (Adsorbent 1) for 2-methyl pentane and 2,2-dimethylbutane is shown in Table A. Its selectivity for 2-methyl pentane/2,2-dimethylbutane separations is 4.

EXAMPLE II

The preparation of Example I was repeated, except that after stirring the aluminate mixture for 5 minutes, 3057 g of a colloidal silica was added together with 466 g. of water. The as-synthesized offretite was calcined as in Example I and was subsequently treated with 2N $NH_4Cl$ for 72 hours at 95° C., followed by treatment with 2.5 $BaCl_2$ for 72 hours at 95° C. The ion-exchanged offretite was finally subjected to a post-exchange heat treatment at 300° C. for 1 hour. The sorptive capacity of this adsorbent (Adsorbent 2) for 2-methyl pentane and 2,2-dimethylbutane is shown in Table A. Its selectivity for 2-methyl pentane/2,2-dimethylbutane separations is 3.2.

EXAMPLE III

A number of additional adsorbents were prepared employing the general procedure set forth in Example I and their adsorption capacities determined. The post exchange heating conditions employed in preparing each of these adsorbents was 300° C. for 1 hour. The results obtained from these experiments are also presented in Table A, together with the results obtained on offretite adsorbents which had not been ion exchanged after calcining (Adsorbent 6) or had been exchanged with ions not in accordance with the invention (Adsorbent 7).

TABLE A

| Run No. | Adsorbent No. | Cation | Exchange conditions | Percent exchangeable ions replaced H+ | Percent exchangeable ions replaced Na+ plus K+ | Sorptive capacity at 150° C., g./100 g. 2-methyl-pentane | Sorptive capacity at 150° C., g./100 g. 2,2-dimeth-ylbutane | Selectivity (capacity ratio) |
|---|---|---|---|---|---|---|---|---|
| 1 | 1 | Mg++ | 24 hrs., 2 N NH₄Cl, 90° C.; 24 hrs., 2 N MgCl₂, 90° C. | 100 | 20 | 4.0 | 1.0 | 4 |
| 2 | 3 | Mg++ | 24 hrs., 2 N NH₄Cl, 90° C.; 3 hrs., 2 N MgCl₂, 90° C. | 100 | 20 | 3.9 | 1.0 | 3.9 |
| 3 | 2 | Ba++ | 72 hrs., 2 N NH₄Cl, 95° C.; 72 hrs., 2.5 N BaCl₂, 95° C.ᵃ | 100 | 25 | 2.9 | 0.75 | 3.2 |
| 4 | 4 | Mg++ | 3 hrs., 2 N MgCl₂ plus Mg(OH)₂, 80° C. | 100 | 25 | 3.5 | 0.72 | 4.9 |
| 5 | 5 | La+++/Ce+++ | 1 hr., approx. 1 N, 25° C.ᵇ | 100 | (ᶜ) | 2.6 | 1.0 | 2.6 |
| 6 | 6 | Acidic offretite | | 0 | 0 | 5.6 | 5.0 | 1.1 |
| 7 | 7 | Li+ | 24 hrs., 2 N NH₄Cl, 90° C.; 24 hrs., 2 N LiCl, 90° C. | 100 | (ᶜ) | 3 | 2.8 | 1.1 |

ᵃ Solutions were charged every 24 hours.
ᵇ Mixture of LaCl₃, CeCl₃ and other rare earth chlorides.
ᶜ Not determined.

From the above table it can be seen that while the alkaline earth and rare earth exchanged offretite zeolites in accordance with the invention demonstrate excellent selectivity between 2-methyl pentane and 2,2-dimethylbutane, this degree of selectivity was not exhibited by offretite zeolits which had not been ion exchanged after calcination or had been ion exchanged with lithium ions.

EXAMPLE IV

The selective sorbents prepared by exchange with Mg++ and Ba++ as disclosed in Examples II and III also exhibit significant selectivity for the separation of certain dibranched aliphatic hydrocarbons from their tribranched isomers. This is shown in Table B for the octane isomers, 2,4-/2,5-dimethyl hexanes and 2,2,4-trimethyl pentane (isooctane). The capacities and selectivities at 150° C. of Adsorbents 1 and 2 for these important hydrocarbons are shown in Table B.

TABLE B

| Adsorbent number | Cation | Sorptive capacity at 150° C., g./100 g. 2,4- and 2,5-dimethylhexanes | Sorptive capacity at 150° C., g./100 g. Isooctane | Selectivity (capacity ratio) |
|---|---|---|---|---|
| 1 | Mg++ | 2.2 | 0.64 | 3.45 |
| 2 | Ba++ | 2.3 | 0.57 | 4.0 |

EXAMPLE V

This example demonstrates the effect of calcination temperature and post-exchange heating conditions on the sorptive capacity and selectivity of offretite zeolite adsorbents. The calcining and post-exchange heating conditions employed are indicated in Table C and D respectively. The offretite zeolites utilized in these experiments were prepared in accordance with the procedures outlined in Examples I and II.

TABLE C

Calcination conditions: Sorptive capacity for 2-methyl pentane at 150° C., g./100 g.

510° C., 2 hours _____ 5.6
700° C., 2 hours _____ ᵃ 4.3
800° C., 16 hours _____ 0.1

ᵃ Average of two runs.

TABLE D

| Absorbent number | Calcination temperature, ° C. | Exchange conditions | Post-exchange heating conditions | Sorptive capacity at 150° C., g./100 g. 2-methyl-pentane | Sorptive capacity at 150° C., g./100 g. 2,2-dimeth-ylbutane | Selectivity (capacity ratio) |
|---|---|---|---|---|---|---|
| 8 | 510 | (ᵃ) | 1 hr., 300° C., N₂ atmosphere | 4.07 | 1.07 | 4 |
| 9 | 510 | (ᵃ) | 2 hrs., 480° C., air | 2.66 | 0.31 | 8.6 |
| 10 | 510 | (ᵇ) | 2 hrs., 450° C. | 2.56 | 0.20 | 13 |

ᵃ 2 N NH₄Cl, 24 hrs., 90° C.; 2 N MgCl₂, 24 hrs., 90° C.
ᵇ 0.2 N NH₄Cl, 24 hrs., 90° C.; 2 N MgCl₂, 3 hrs., 90° C.

The data in Table C demonstrate that pre-exchange calcining of offretite at temperatures above 700° C. results in a substantial loss of capacity for mono-branched aliphatic hydrocarbons. The data in Table D on the other hand shows that the selectivity of ion-exchanged offretite can be substantially increased by careful control of the post-exchange heating conditions, and specifically by increasing the severity of post-exchange heat treatment.

What is claimed is:

1. In a process for separating aliphatic hydrocarbons of from 5 to 8 carbon atoms having two methyl substituents on the same carbon atom or more highly branched $C_5$ to $C_8$ aliphatic hydrocarbons from aliphatic hydrocarbons of from 5 to 8 carbon atoms having two methyl substituents on different carbon atoms or less-branched $C_5$ to $C_8$ aliphatic hydrocarbons by contracting a mixture of said hydrocarbons with a bed of a selective adsorbent whereby the less-branched aliphatic hydrocarbons are selectively adsorbed and the more highly branched hydrocarbons pass through, the improvement which comprises selectively adsorbing said less-branched aliphatic hydrocarbons on a cation-exchanged offretite zeolite prepared by (1) calcining an offretite zeolite containing tetraalkylammonium ion at a temperature below 700° C. for a sufficient time that substantially all of the tetraalkylammonium ion is decomposed, (2) treating said calcined offretite zeolite with an aqueous solution of a Group II–A or rare earth metal under conditions that essentially all of the hydrogen ions and from 5 to 70% of the other exchangeable ions of said calcined offretite zeolite are exchanged with said metals and (3) heat treating said exchanged offretite zeolite at a temperature of from 200 to 600° C. for at least one-half hour.

2. The process of claim 1 wherein the calcined offretite is exchanged with ammonium ion prior to exchange with the Group II–A or rare earth metal.

3. The process of claim 2 wherein the zeolite offretite is exchanged with magnesium.

4. The process of claim 3 wherein the initial calcination step is conducted at a temperature of from 450 to 700° C.

5. The process of claim 4 wherein the exchanged offretite is heated to a temperature of from 400 to 500° C.

6. The process of claim 5 wherein essentially all of the hydrogen ions and from 10 to 40% of the other exchangeable ions of said calcined offretite are exchanged.

7. The process of claim 1 wherein the mixture of aliphatic hydrocarbons to be separated is a $C_6$ isomerizate containing 2-methylpentane and 2,2-dimethylbutane.

8. The process of claim 1 wherein the mixture of aliphatic hydrocarbons to be separated is an isobutane alkylate stream containing 2,4- and 2,5-dimethyl hexanes and trimethyl pentanes.

9. The process of claim 1 wherein adsorption and desorption steps are performed cyclically employing an eluent.

10. The process of claim 9 wherein the eluent is isobutane.

11. The process of claim 9 wherein the calcined offretite is first exchanged with ammonium ion and subsequently with magnesium.

12. The process of claim 10 wherein the mixture of aliphatic hydrocarbons to be separated is an isomerizate stream from the catalytic isomerization of normal paraffins, and the desorbate and isobutane eluent from the desorption step are recycled to the catalytic isomerization process.

References Cited
UNITED STATES PATENTS

| | | | |
|---|---|---|---|
| 2,935,539 | 5/1960 | Gladrow et al. | 260—676 MS |
| 2,956,089 | 10/1960 | Mattox et al. | 260—676 MS |
| 3,706,813 | 12/1972 | Neuzil | 208—310 |
| 3,578,398 | 5/1971 | Jenkins | 208—111 |

HERBERT LEVINE, Primary Examiner

U.S. Cl. X.R.

252—455 Z; 260—676 MS